No. 729,478. PATENTED MAY 26, 1903.
G. F. WISSMAN.
FRICTION CLUTCH MECHANISM.
APPLICATION FILED MAR. 24, 1902.
NO MODEL. 2 SHEETS—SHEET 1.

WITNESSES: INVENTOR:
W. L. Bushong George F. Wissman
F. E. Bryant BY
V. H. Lockwood
ATTORNEY.

No. 729,478. PATENTED MAY 26, 1903.
G. F. WISSMAN.
FRICTION CLUTCH MECHANISM.
APPLICATION FILED MAR. 24, 1902.
NO MODEL. 2 SHEETS—SHEET 2.
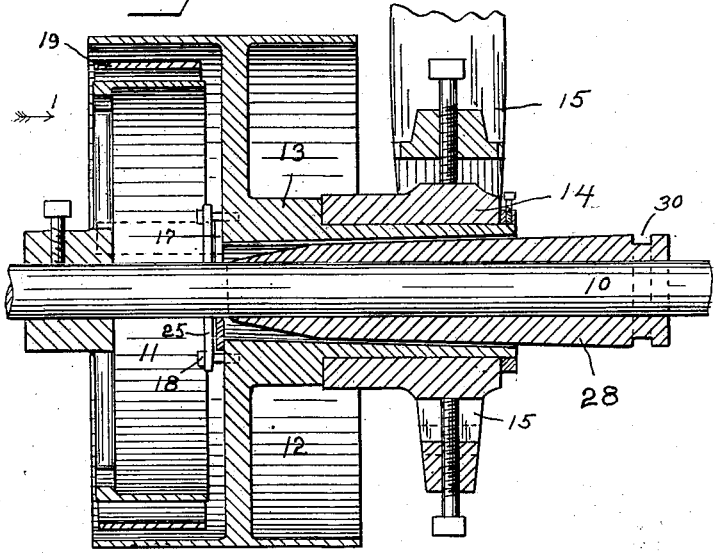
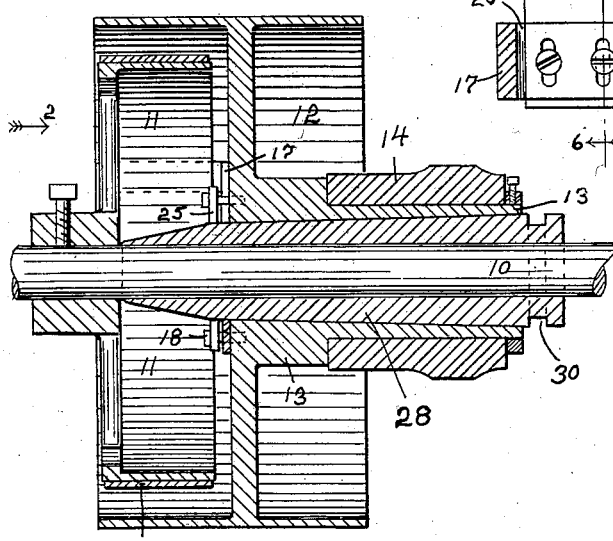
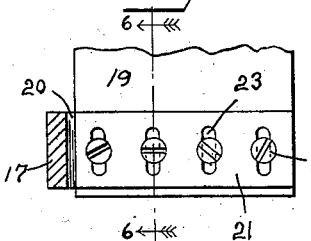
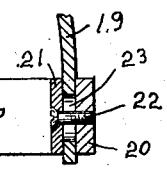
WITNESSES: INVENTOR.
George F. Wissman.
BY
V. H. Lockwood.
ATTORNEY.

No. 729,478. Patented May 26, 1903.

UNITED STATES PATENT OFFICE.

GEORGE F. WISSMAN, OF INDIANAPOLIS, INDIANA.

FRICTION-CLUTCH MECHANISM.

SPECIFICATION forming part of Letters Patent No. 729,478, dated May 26, 1903.

Application filed March 24, 1902. Serial No. 99,674. (No model.)

*To all whom it may concern:*

Be it known that I, GEORGE F. WISSMAN, of Indianapolis, county of Marion, and State of Indiana, have invented a certain new and useful Friction-Clutch Mechanism; and I do hereby declare that the following is a full, clear, and exact description thereof, reference being had to the accompanying drawings, in which like figures refer to like parts.

The object of this invention is to provide a friction-clutch mechanism on a line-shaft so arranged that the belt transmitting power from the line-shaft to the machine to be driven will not run when such machine is not being operated. Therefore an idle pulley on the machine to be driven is with my invention unnecessary. To do this, I provide a pulley surrounding the line-shaft and mounted independently of it and with controllable connection between said pulley and the clutch-wheel fixed on the line-shaft. Furthermore, the pulley being mounted independently of the clutch-wheel on the line-shaft, there is no friction between it and the clutch-wheel and line-shaft when the pulley is not in motion.

The exact nature of this invention will be understood from the accompanying drawings, showing one way of carrying out my invention, and the following description and claims.

Figure 1:
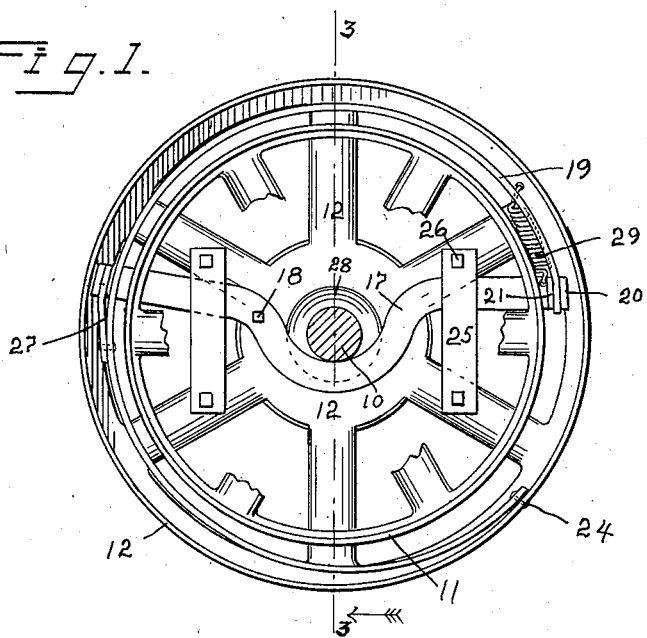
Figure 2:
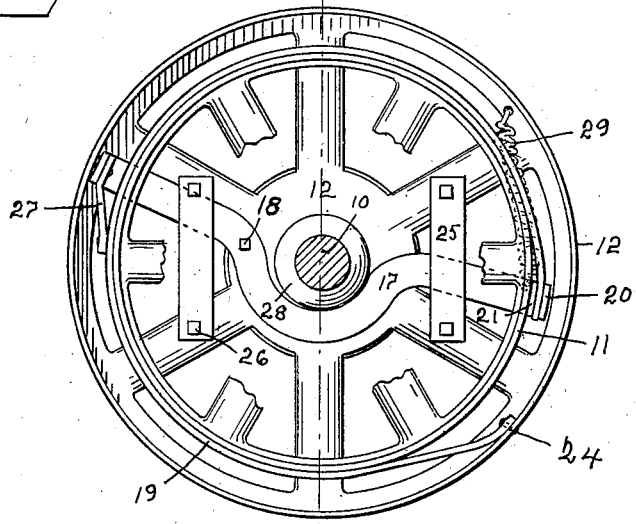

In the drawings, Figure 1 is a cross-section through the line-shaft near the pulley mechanism, showing the latter in side elevation with the pulley disengaged from the clutch-wheel, some of the spokes of the clutch-wheel being broken away. Fig. 2 is the same with the parts modified, so as to show the pulley connected with the clutch-wheel, whereby they are both rotated together. Fig. 3 is a central longitudinal section through a portion of the line-shaft and said pulley mechanism and hanger, the latter being partly broken away and showing the parts in position while the pulley is not in use. Fig. 4 is the same with the hanger omitted and the parts in position to cause the pulley to rotate with the clutch-wheel. Fig. 5 is a detail of the end of the friction-strap that transmits power from the clutch-wheel to the pulley and means for adjustably mounting the same. Fig. 6 is a section on the line 6 6 of Fig. 5.

In detail the device herein shown to illustrate the general nature of my invention consists of a line-shaft 10, the mountings of which are not shown. A clutch-wheel 11 is rigidly mounted on said line-shaft.

The pulley 12 is more than two times as wide as the clutch-wheel 11 and is of greater diameter, so that one-half of it will surround and embrace the clutch-wheel. Said pulley has a hollow spindle 13, extending in only one direction from the web and center of the pulley, and is mounted in the bearing 14, carried by the hanger 15. The construction of the hanger is well known, and the means to which it is connected is not shown. This hanger supports only the pulley and not the line-shaft and clutch-wheel. The internal diameter of the hollow spindle 13 is considerably greater than the line-shaft.

The means for connecting the pulley and clutch-wheel, so as to transmit power from one to the other, is as follows: A double-ended lever 17 is pivoted to the web of the pulley by the pivot-pin 18 to one side of the center of said pulley. Said lever 17 extends almost from one side to the other of the pulley and beyond the periphery of the clutch-wheel and is centrally curved around the line-shaft. As shown in Figs. 1 and 3, the lever 17 is mounted between the pulley and clutch-wheel, and at the end of said lever that is farthest from the pivotal point 18 I secure one end of the friction-strap 19 to the arm 20, that extends laterally from said lever, as shown in Fig. 5, and over the periphery of the clutch-wheel. The length of the arm 20 is substantially the same as the width of the clutch-wheel. The friction-strap is adjustably clamped to said arm 20 by the clamping-plate 21 and the screws 22, extending through the slots 23 in said strap, as shown in Fig. 5. The strap 19 extends almost around the clutch-wheel and at its other end is secured to the internal periphery of the pulley at 24, as shown in Figs. 1 and 2. The length of the strap 19 is such that when the end of the lever 17 is thrown down from the position shown in Fig. 1 to the position shown in Fig. 2 it will draw said strap tightly about the clutch-wheel 11, and since said clutch-wheel is being driven by the line-shaft it will through said strap 19 transmit rotary movement to the pulley 12. When the lever 17 is thrown up from the position shown in Fig. 2 to the position shown in Fig.

1 and relaxes said strap 19, the clutch-wheel will fail to transmit its rotary movement to the pulley.

A pair of plates 25 are secured by bolts 26 to the spokes of the pulley on one side of the center and somewhat separated or spaced from the pulley to furnish a guide for the oscillation of the lever 17. To hold the strap 19 out of contact with the clutch-wheel while it is not desired to actuate the pulley, I connect a supporting-strap 27 to the strap 19 below the lever 17 and fasten the supporting-strap to the end of the lever 17 nearest the pivotal point 18. This means for holding the strap 19 out of contact with the pulley 11 does not interfere with the tightening of the strap 19 about said pulley 11, as shown in Fig. 2.

To actuate the lever 17 for connecting or disconnecting the two pulleys, I use a sliding bushing 28, surrounding the line-shaft and operating between it and the hollow spindle 13 of the pulley 12. The inner end of said bushing is tapering, so that when the bushing is pushed in from the position shown in Figs. 1 and 3 it gradually forces the extreme end of the lever 17 downward until the parts assume the position shown in Figs. 2 and 4. This tightens the strap 19 and locks the pulley and clutch-wheel together. When it is desired to unlock the pulley and clutch-wheel and not actuate the pulley 12, the bushing is moved backward from the position shown in Fig. 4 to that shown in Fig. 3, so that it disengages the lever 17, and the lever is thrown back into the position shown in Fig. 1 by the spring 29. This is a spiral spring, connected at one end to the lever 17 and at the other end to the driven pulley 12.

While the extreme inner end of the bushing 28 tapers, as explained, the entire body of the bushing also tapers in the same direction as the end, but with a considerably less inclination, as shown in Figs. 3 and 4, so that as it is moved inward it will bind with the hollow spindle 13 of the pulley tight enough to prevent the return or escape of the bushing from the position shown in Fig. 4 to that shown in Fig. 3. To assist in this purpose, the bore of the hollow spindle 13 tapers reversely of the taper of the bushing, so that they fit together comparatively tight, yet when the bushing is moved into the position shown in Fig. 3 there is ample clearance between the bushing and the spindle of the driven wheel. To prevent the lever 17 by reason of the upward pull of the spring 29 from forcing the bushing 28 from the locking to the unlocking position, the bushing and the bore of the spindle 13 are of such dimensions that when the bushing is pushed inward the lever 17 will rest upon the main body thereof, which is very slightly tapered, instead of upon the extreme tapered portion. If said bushing did not enter so far and the lever 17 rested upon the extreme tapering portion, there would be a tendency upon the part of the lever to force the bushing back. Hence the length of the bushing is such as to cause it to enter so far as to keep the lever 17 off its extreme tapered end while the pulleys are locked together. The bushing is loosely mounted on the line-shaft 10 and has a groove 30 in it to receive some means, such as a lever, for actuating the bushing.

The operation of the device is as follows: When it is desired to actuate the pulley 12, the bushing 28 is thrown inward, as shown in Fig. 4, and when it is desired to stop the actuation of the pulley 12 the bushing is returned to the position shown in Fig. 3. Then the pulley 12 and also the belt connecting it with the machine to be driven are stationary and remain so until the pulley and clutch-wheel are again locked together. The return movement of the lever 17 is stopped or limited by the line-shaft.

What is claimed to be the invention, and desired to be secured by Letters Patent, is—

1. The combination of a clutch-wheel, a pulley surrounding the same, a strap secured to the pulley and surrounding the clutch-wheel, a lever pivoted to the pulley and extending beside and beyond the clutch-wheel, an arm extending laterally from the end of the lever over the rim of the clutch-wheel, and clamping-bolts extending through said arm for securing said strap thereto, said strap having longitudinal slots through it for adjusting the same.

2. The combination of a clutch-wheel, a pulley surrounding the same, a strap secured to the pulley and surrounding the clutch-wheel, a lever pivoted to the pulley and extending beyond the rim of the clutch-wheel on both sides thereof and at one end secured to the end of said strap, a connection between the other end of said lever and said strap, and means for actuating said lever.

3. The combination of a clutch-wheel, a pulley surrounding the same with a central opening through the pulley, a strap secured to the pulley and surrounding the clutch-wheel, a lever pivoted to the pulley with one end secured to said strap and the other end extending across the opening through the pulley to one side of the center thereof, and means movable through said opening in the pulley for actuating said lever.

4. The combination of a line-shaft, a clutch-wheel secured thereon, a pulley surrounding the same with a central opening through the pulley, a strap secured to the pulley and surrounding the clutch-wheel, a lever pivoted to the pulley with one end secured to said strap and the other end extending across the opening through the pulley to one side of the center thereof, and a bushing loosely surrounding the line-shaft that is laterally movable through the opening in the pulley and having a conical end for engaging and actuating said lever.

5. The combination of a line-shaft, a clutch-wheel secured thereon, a pulley surrounding the same with a central opening through the pulley of greater diameter than the line-shaft, a strap secured to the pulley and surrounding the clutch-wheel, a lever pivoted to the pulley to one side of its center and extending in opposite directions beyond the clutch-wheel, and at the point farthest from the pivot secured to said strap, said lever being centrally curved about the line-shaft so that the line-shaft will not interfere with the action of the lever, a connection between the end of the lever nearest the pivot and said strap, and a bushing loosely surrounding the line-shaft that is laterally movable through the opening in the pulley and has a conical end for engaging and actuating said lever.

In witness whereof I have hereunto affixed my signature in the presence of the witnesses herein named.

GEORGE F. WISSMAN.

Witnesses:
V. H. LOCKWOOD,
FLORENCE E. BRYANT.